United States Patent
Kamata

(10) Patent No.: US 10,800,913 B2
(45) Date of Patent: Oct. 13, 2020

(54) THERMOPLASTIC RESIN COMPOSITION FOR HOT PLATE WELDING, MOLDED ARTICLE THEREOF, AND RESIN CONJUGATE

(71) Applicant: Techno-UMG Co., Ltd., Tokyo (JP)

(72) Inventor: Ichiro Kamata, Ube (JP)

(73) Assignee: Techno-UMG Co., Ltd. (JP)

( * ) Notice: Subject to any disclaimer, the term of this patent is extended or adjusted under 35 U.S.C. 154(b) by 0 days.

(21) Appl. No.: 16/479,885

(22) PCT Filed: Dec. 13, 2017

(86) PCT No.: PCT/JP2017/044725
§ 371 (c)(1),
(2) Date: Jul. 22, 2019

(87) PCT Pub. No.: WO2018/139087
PCT Pub. Date: Aug. 2, 2018

(65) Prior Publication Data
US 2020/0207971 A1  Jul. 2, 2020

(30) Foreign Application Priority Data
Jan. 25, 2017 (JP) ................ 2017-010920

(51) Int. Cl.
  C08L 35/02 (2006.01)
  C08L 51/04 (2006.01)
  C08L 25/12 (2006.01)
  C08K 5/098 (2006.01)

(52) U.S. Cl.
CPC .............. C08L 51/04 (2013.01); C08K 5/098 (2013.01); C08L 25/12 (2013.01)

(58) Field of Classification Search
CPC .......... C08L 51/04; C08L 35/02; C08L 25/12; C08K 5/098
USPC ...................................................... 524/400
See application file for complete search history.

(56) References Cited

U.S. PATENT DOCUMENTS

| | | | |
|---|---|---|---|
| 2004/0242803 A1* | 12/2004 | Ohme ................ | C08L 2666/16 525/400 |
| 2005/0256275 A1* | 11/2005 | Kobayashi ............ | C08L 69/00 525/349 |
| 2006/0155067 A1 | 7/2006 | Motoshige et al. | |
| 2009/0275678 A1* | 11/2009 | Kumazawa ............ | C08L 69/00 523/523 |
| 2010/0187965 A1 | 7/2010 | Wakita et al. | |
| 2012/0149837 A1 | 6/2012 | Kumazawa et al. | |
| 2013/0338311 A1 | 12/2013 | Wakita et al. | |
| 2017/0190896 A1 | 7/2017 | Yamamori et al. | |

FOREIGN PATENT DOCUMENTS

| | | |
|---|---|---|
| CN | 101108903 A | 1/2008 |
| CN | 101511944 A | 8/2009 |
| CN | 102101927 A | 6/2011 |
| JP | 2000290476 A | 10/2000 |
| JP | 2001002881 A | 1/2001 |
| JP | 2001011293 A | 1/2001 |
| JP | 2001253990 A | 9/2001 |
| JP | 2004262961 A | 9/2004 |
| JP | 2005239823 A | 9/2005 |
| JP | 2008115312 A | 5/2008 |
| JP | 2008230140 A | 10/2008 |
| JP | 2009155479 A | 7/2009 |
| JP | 2009166274 A | 7/2009 |
| JP | 2016003294 A | 1/2016 |
| JP | 2016008237 A | 1/2016 |
| KR | 20020052421 A | 7/2002 |
| WO | 2006071097 A1 | 7/2006 |
| WO | 2009011280 A1 | 1/2009 |
| WO | 2012108485 A1 | 8/2012 |
| WO | 2015199038 A1 | 12/2015 |

OTHER PUBLICATIONS

China National Intellectual Property Administration, Application No. 201780084322.0, Office Action and Search Report, translation of Search report, dated Oct. 30, 2019.
European Patent Office, Supplementary European Search Report and Annex, European Patent Application No. 17894493.0, completed Dec. 5, 2019, dated Dec. 16, 2019 (4 pages).
International Search Report for PCT/JP2017/044725 dated Jan. 30, 2018.
Office Action issued by Japanese Patent Office for JP 2017-070920 with English translation, dated Feb. 14, 2017 (6 pages).
Office Action issued by Japanese Patent Office for JP 2017-010920 with English translation dated May 16, 2017 (4 pages).
China National Intellectual Property Administration, Application No. 201780084322.0, Second Office Action and Search Report with English translation, dated Mar. 27, 2020 (10 pages).

* cited by examiner

*Primary Examiner* — Deve V Hall
(74) *Attorney, Agent, or Firm* — St. Onge Steward Johnston & Reens, LLC

(57) ABSTRACT

A thermoplastic resin composition is provided from which a molded article that has excellent string resistance at the time of hot plate welding, a highly excellent surface appearance, generates a small amount of gas from the material, and has sufficient impact resistance as a material for a lamp housing can be obtained. The thermoplastic resin composition contains a thermoplastic resin component and a saponified fatty acid ester, in which a content of the saponified fatty acid ester is in a range of 0.1 parts by mass to 10 parts by mass with respect to 100 parts by mass of the thermoplastic resin component.

4 Claims, No Drawings

THERMOPLASTIC RESIN COMPOSITION FOR HOT PLATE WELDING, MOLDED ARTICLE THEREOF, AND RESIN CONJUGATE

FIELD OF THE INVENTION

The present invention relates to a thermoplastic resin composition and a molded article.

BACKGROUND OF THE INVENTION

In the related art, as a method of joining resin-molded articles, for example, mechanical joining using screws or bolts, joining using an adhesive such as a hot melt, thermal joining carried out by heating and melting resin-molded articles which is represented by hot plate welding, vibration welding using frictional heat generated by vibrating a joining portion, or laser welding using absorption heat generation of a joining portion which has been irradiated with laser light has been applied. From the viewpoints of reducing processing steps, reducing the weight, and reducing the environmental load, recently, the usefulness of hot plate welding, vibration welding, and laser welding has been increasing.

In the hot plate welding, a certain amount of a portion in a resin-molded article to be joined is melted by a heated hot plate so that both of the hot plate and the portion are pressure-bonded to each other. However, the welding strength of the hot plate welding is increased in a case where molded articles (components) formed of the same kind of thermoplastic resin are heat-welded, but the weldability (meltability) is not favorable in a case where molded articles (components) formed of different thermoplastic resins are heat-welded, which is problematic.

Examples thereof include automotive lamp housings using a head lamp, a rear combination lamp, or the like. Among thermoplastic resins, styrene-based resins such as ABS with excellent weldability have been employed as these resin-molded articles. However, with the recent improvement of the performance of automotive lamps, inner portions of lamps become high-temperature regions, and thus the shapes or designs of molded articles are greatly restricted in a case of using these resins. Therefore, resins which can be used in high-temperature regions have been required in the automotive lamp industries.

A heat-resistant ABS resin or a mixture of this heat-resistant ABS resin and a polycarbonate resin is considered for such a demand. However, in these resins, at the time of melting a resin-molded article using a heated hot plate and the resin-molded article is separated from the hot plate during hot plate welding, a welded portion of the resin is stretched in a thread shape (a stringing phenomenon), this welded portion is adhered to the surface of the molded article of a lamp lens or a lamp housing, and this may cause a problem leading to a poor appearance.

In a case of automotive lamp housings or the like, the final product is partially and frequently subjected to secondary processing such as coating, metal deposition, or plating. Accordingly, in order to adapt to this secondary processing, the surface of the molded article needs to be highly finished. Consequently, the defect rate at the time of molding is greatly increased unless the molded article is a molded material having a markedly excellent surface state (surface appearance) at the time of molding. Therefore, in a case where the molded article is used for a lamp housing or the like, there has been a demand for a molded material which does not have strings and has a markedly excellent surface appearance.

In a case where the amount of gas to be contained in the material is large, since a problem of occurrence of fogging on a lens in a sealed lamp product or occurrence of fogging on the surface of a molded article at the time of molding may occur, it is extremely important to control the gas-generating property of the material from the viewpoint of industrial mass production of lamp products.

As described above, recent automotive lamp housings are required not to cause a stringing phenomenon in which the welded portion of a resin is stretched in a thread shape at the time of hot plate welding, in other words, recent automotive lamp housings are required to have excellent string resistance. Further, automotive lamp housings are required to have a highly excellent surface appearance, generate a small amount of gas from the material, and have sufficient impact resistance as a material for a lamp housing.

PTL 1 discloses, as a material with excellent string resistance at the time of hot plate welding, a resin composition obtained by adding a relatively low-molecular-weight copolymer containing $\alpha$-methylstyrene as a main component to a rubber-reinforced styrene-based resin.

However, since it is determined that strings are not present in a case where the length of a thread is 0.5 cm or less, it cannot be said that strings are not present at the time at which the temperature of the hot plate or the moisture absorption state of the molded article is changed, and the surface appearance after molding is not mentioned.

PTL 2 discloses, as a material having excellent string resistance at the time of hot plate welding and an excellent surface appearance after vacuum deposition, a resin composition which contains a specific $\alpha$-methylstyrene-based copolymer and a rubber-containing graft copolymer having a small particle diameter at a specific ratio.

However, the performance required for recent lamp housings such as impact resistance is not mentioned.

PTL 3 discloses, as a material having excellent string resistance at the time of hot plate welding and an excellent surface appearance of a molded article, a resin composition obtained by blending a saponified resin of a copolymer with a rubber-reinforced styrene-based resin.

However, PTL 3 only mentions the presence or absence of silver streaks or delamination as the surface appearance and does not mention a highly excellent deposition appearance which is required for a lamp housing.

CITATION LIST

Patent Literature

[PTL 1] Japanese Unexamined Patent Application, First Publication No. 2001-2881

[PTL 2] Japanese Unexamined Patent Application, First Publication No. 2001-253990

[PTL 3] Japanese Unexamined Patent Application, First Publication No. 2016-3294

SUMMARY OF THE INVENTION

Technical Problem

An object of the present invention is to provide a thermoplastic resin composition from which a molded article that has excellent string resistance at the time of hot plate welding, a highly excellent surface appearance, generates a small amount of gas from the material, and has sufficient impact resistance as a material for a lamp housing can be obtained. Further, another object of the present invention is to provide a molded article which has excellent string resistance at the time of hot plate welding, a highly excellent surface appearance, generates a small amount of gas from the material, and has sufficient impact resistance as a material for a lamp housing.

Solution to Problem

As the result of intensive research conducted by the present inventors, it was found that the above-described problems can be solved by adding a saponified fatty acid ester to a thermoplastic resin composition, thereby completing the present invention.

In other words, the present invention includes the following aspects.

According to the present invention, a thermoplastic resin composition for hot plate welding is provided, including: a thermoplastic resin component (A); and a saponified fatty acid ester (B), in which a content of the saponified fatty acid ester (B) is in a range of 0.1 parts by mass to 10 parts by mass with respect to 100 parts by mass of the thermoplastic resin component (A), and the thermoplastic resin component (A) contains any one or a combination of two or more selected from the group consisting of an acrylonitrile-styrene copolymer (AS resin), an acrylonitrile-α-methylstyrene copolymer (αSAN resin), a styrene-maleic anhydride copolymer, an acrylonitrile-styrene-N-substituted maleimide terpolymer, an acrylonitrile-styrene-α-methylstyrene-N-substituted maleimide tetrapolymer, a styrene-maleic anhydride-N-substituted maleimide terpolymer, an acrylonitrile-butadiene-styrene copolymer (ABS resin), an acrylonitrile-styrene-alkyl (meth)acrylate copolymer (ASA resin), an acrylonitrile-ethylene-propylene-diene-styrene copolymer (AES resin), polymethyl methacrylate, and a polycarbonate resin.

Here, it is desirable that the thermoplastic resin component (A) for hot plate welding contain a graft copolymer (C) in which a vinyl-based polymer (c2) is grafted with a rubber-like polymer (c1).

Further, it is desirable that the saponified fatty acid ester (B) be a saponified montanic acid ester.

According to the present invention, a molded article is provided, which is molded using the thermoplastic resin composition for hot plate welding of the present invention.

Further, a resin conjugate is provided, to which the molded article for hot plate welding described above is joined by hot plate welding.

Advantageous Effects of Invention

According to the thermoplastic resin composition of the present invention, it is possible to obtain a molded article that has excellent string resistance at the time of hot plate welding, a highly excellent surface appearance, generates a small amount of gas from the material, and has sufficient impact resistance as a material for a lamp housing.

Further, the molded article of the present invention has excellent string resistance at the time of hot plate welding, a highly excellent surface appearance, generates a small amount of gas, and has sufficient impact resistance as a material for a lamp housing.

DETAILED DESCRIPTION OF THE INVENTION

Hereinafter, the present invention will be described in detail.

[Thermoplastic Resin Composition]

A thermoplastic resin composition of the present invention contains a thermoplastic resin component (A) and a saponified fatty acid ester (B). The thermoplastic resin composition of the present invention includes a thermoplastic resin composition for hot plate welding, but the present invention is not limited thereto.

<Thermoplastic Resin Component (A)>

Examples of the thermoplastic resin component (A) include an acrylonitrile-styrene copolymer (AS resin), an acrylonitrile-α-methylstyrene copolymer (αSAN resin), a styrene-maleic anhydride copolymer, an acrylonitrle-styrene-N-substituted maleimide terpolymer, an acrylonitrle-styrene-α-methylstyrene-N-substituted maleimide tetrapolymer, a styrene-maleic anhydride-N-substituted maleimide terpolymer, an acrylonitrile-butadiene-styrene copolymer (ABS resin), an acrylonitrile-styrene-alkyl (meth)acrylate copolymer (ASA resin), an acrylonitrile-ethylene-propylene-diene-styrene copolymer (AES resin), polymethyl methacrylate, a polycarbonate resin, polybutylene terephthalate (PBT resin), polyethylene terephthalate (PET resin), polyvinyl chloride, polyolefin such as polyethylene or polypropylene, a styrene-based elastomer such as styrene-butadiene-styrene (SBS), styrene-butadiene (SBR), hydrogenated SBS, or styrene-isoprene-styrene (SIS), various olefin-based elastomers, various polyester-based elastomers, polystyrene, a methyl methacrylate-styrene copolymer (MS resin), an acrylonitrile-styrene-methyl methacrylate copolymer, a polyacetal resin, modified polyphenylene ether (modified PPE resin), an ethylene-vinyl acetate copolymer, a PPS resin, a PES resin, a PEEK resin, polyarylate, a liquid crystal polyester resin, and a polyamide resin (nylon).

These thermoplastic resin components (A) may be used alone or in combination of two or more kinds thereof.

Among these, it is preferable that the thermoplastic resin component contain a graft copolymer (C) in which a vinyl-based polymer (c2) is grafted with a rubber-like polymer (c1) such as an ABS resin, an ASA resin, or an AES resin and particularly preferable that the thermoplastic resin component contain a vinyl-based copolymer (D) such as an AS resin, an αSAN resin, an acrylonitrile-styrene-N-substituted maleimide terpolymer, or an acrylonitile-styrene-α-methylstyrene-N-substituted maleimide tetrapolymer.

<Graft Copolymer (C)>

The rubber-like polymer (c1) constituting the graft copolymer (C) is not particularly limited, and examples thereof include a butadiene-based rubber-like polymer such as polybutadiene, a styrene/butadiene copolymer, an acrylonitrile-butadiene copolymer, or an acrylic acid ester/butadiene copolymer; a conjugated diene-based rubber-like polymer such as isoprene, chloroprene, or a styrene/isoprene copolymer; an acrylic rubber-like polymer such as polybutyl acrylate; an olefin-based rubber-like polymer such as an ethylene/propylene copolymer, a silicone-based rubber-like polymer such as polyorganosiloxane; and natural rubber, butyl rubber, urethane rubber, chlorinated polyethylene, epichlorohydrin rubber, fluorine rubber, and polysulfide rubber. These may be used alone or in combination of two or more kinds thereof. Further, these rubber-like polymers can be used from monomers, and a composite rubber structure or a core/shell structure may be employed as the rubber-like polymer structure.

Among the above-described rubber-like polymers, from the viewpoints that the impact resistance or the surface appearance of a molded article to be obtained is excellent, polybutadiene, a styrene-butadiene copolymer, a butadiene-based rubber-like polymer, an acrylic rubber-like polymer, an olefin-based rubber-like polymer, or a silicone-based rubber-like polymer is preferable.

The average particle diameter of the rubber-like polymer (c1) is preferably in a range of 150 nm to 250 nm and more preferably in a range of 180 nm to 220 nm. In a case where the average particle diameter is in the above-described range, the balance between the impact resistance and the surface appearance of the molded article is further improved.

The average particle diameter of the rubber-like polymer (c1) can be obtained by measuring the particle size distribution based on the volume using a particle size distribution measuring device (UPA-EX150 type, manufactured by Nikkiso Co., Ltd.) and performing calculation based on the obtained particle size distribution.

The graft copolymer (C) is in the form in which the vinyl-based polymer (c2) obtained by polymerizing various vinyl-based monomers is grafted with the rubber-like polymer (c1).

The vinyl-based monomer is not particularly limited, and examples thereof include an aromatic vinyl compound, (meth)acrylic acid alkyl ester, and a vinyl cyanide compound.

Examples of the aromatic vinyl compound include styrene, α-methylstyrene, and p-methylstyrene.

Examples of the (meth)acrylic acid alkyl ester include methyl methacrylate, ethyl methacrylate, 2-ethylhexyl methacrylate, methyl acrylate, ethyl acrylate, n-butyl acrylate, isobutyl acrylate, and t-butyl acrylate.

Examples of the vinyl cyanide compound include acrylonitrile and methacrylonitrile.

These vinyl-based monomers may be used alone or in combination of two or more kinds thereof.

Among the above-described vinyl-based monomers, from the viewpoint of further improving the impact resistance of the molded article, it is preferable to combine styrene and acrylonitrile.

The graft copolymer (C) is obtained by graft-polymerizing the rubber-like polymer (c1) with the vinyl-based polymer (c2).

A method of performing graft polymerization is not particularly limited, but emulsion polymerization is preferable from the viewpoint that the reaction can be controlled so that the reaction stably proceeds. Specific examples thereof include a method of collectively adding vinyl-based monomers to the rubber-like polymer (c1) and performing polymerization; a method of adding some vinyl-based monomers to the rubber-like polymer (c1) in advance and adding the rest dropwise to the polymerization system as needed while carrying out polymerization; and a method of performing polymerization as needed while adding the total amount of the vinyl-based monomers dropwise to the rubber-like polymer (c1). Further, these methods can be carried out by being divided into one or more stages. In addition, these methods can be carried out by changing the kind or the compositional ratio of the vinyl-based monomers in each stage.

The mass ratio between the rubber-like polymer (c1) and the vinyl-based polymer (c2) is not particularly limited, but it is preferable that the content of the rubber-like polymer (c1) be in a range of 10% by mass to 80% by mass and the content of the vinyl-based polymer (c2) be in a range of 20% by mass to 90% by mass and more preferable that the content of the rubber-like polymer (c1) be in a range of 30% by mass to 70% by mass and the content of the vinyl-based polymer (c2) be in a range of 30% by mass to 70% by mass (here, the total amount of the rubber-like polymer (c1) and the vinyl-based polymer (c2) be set to 100% by mass). In a case where graft polymerization is carried out at such a mass ratio, the impact resistance of the molded article tends to be further improved.

Typically, a radical polymerization initiator or an emulsifier is used for graft polymerization.

Examples of the radical polymerization initiator include a peroxide, an azo-based initiator, and a redox-based initiator obtained by combining an oxidant and a reducing agent. Among these, a redox-based initiator is preferable, and a sulfoxylate-based initiator obtained by combining ferrous sulfate, an ethylenediaminetetraacetic acid disodium salt, sodium formaldehyde sulfoxylate, and hydroperoxide is particularly preferable.

Further, since the molecular weight or the graft rate of the graft copolymer (C) to be obtained is controlled at the time of performing radical polymerization, various known chain transfer agents may be added.

The emulsifier is not particularly limited. From the viewpoints of obtaining excellent stability of a latex during radical polymerization and increasing the polymerization rate, various carboxylates such as sodium sarcosinate, fatty acid potassium, fatty acid sodium, dipotassium alkenyl succinate, and a rosin acid soap are exemplified. Among these, from the viewpoint of suppressing generation of gas at the time of molding the graft copolymer (C) to be obtained and the thermoplastic resin composition containing the graft copolymer (C) at a high temperature, dipotassium alkenyl succinate is preferable.

The graft copolymer (C) is typically obtained in a state of a latex. Examples of a method of recovering the graft copolymer (C) from the latex of the graft copolymer (C) include a wet method of coagulating the latex of the graft copolymer (C) in the form of a slurry by putting the latex into hot water in which a coagulant is dissolved; and a spray-drying method of semi-directly recovering the graft copolymer (C) by spraying the latex of the graft copolymer (C) to a heating atmosphere.

Examples of the coagulant used for the wet method include an inorganic acid such as sulfuric acid, hydrochloric acid, phosphoric acid, or nitric acid; and a metal salt such as calcium chloride, calcium acetate, or aluminum sulfate, and the coagulant is selected according to the emulsifier used for polymerization. For example, in a case where only a carboxylic acid soap such as a fatty acid soap or a rosin acid soap is used as the emulsifier, one or more of the above-described coagulants can be used. Further, in a case where an emulsifier exhibiting stable emulsifying power even in an acidic region such as sodium alkyl benzene sulfonate as an emulsifier is used, a metal salt is suitable as the coagulant.

The graft copolymer (C) in a slurry state is obtained in a case of using the wet method. Examples of a method of obtaining the graft copolymer (C) in a dried state from the graft copolymer (C) in a slurry state include a method of firstly eluting remaining emulsifier residues in water so as to be washed, dehydrating the slurry using a centrifuge or a press dehydrator, and drying the resulting slurry using an air flow dryer; and a method of simultaneously performing dehydrating and drying the slurry using a squeeze dehydrator or an extruder. By using such a method, a powdery or particulate dry graft copolymer (C) is obtained.

The washing conditions are not particularly limited, but it is preferable that the emulsifier residues be washed under a condition in which the amount of the emulsifier residues contained in 100% by mass of the dried graft copolymer (C) is in a range of 0.5% by mass to 2% by mass. In a case where the amount of the emulsifier residues in the graft copolymer (C) is 0.5% by mass or greater, the fluidity of the graft copolymer (C) to be obtained and the thermoplastic resin composition containing the graft copolymer (C) tends to be further improved. Further, in a case where the amount of the emulsifier residues in the graft copolymer (C) is 2% by mass or less, generation of gas at the time of molding the thermoplastic resin composition at a high temperature can be suppressed.

In addition, a molded article may be obtained by directly sending the graft copolymer (C) to an extruder or a molding machine that produces a thermoplastic resin composition without recovering the graft copolymer (C) discharged from a squeeze dehydrator or an extruder.

The reduced viscosity (soluble amount of 0.2 g/N in a 50 mL solution of N,N-dimethylformamide, 25° C.) of acetone solubles in the graft copolymer (C) is preferably in a range of 0.3 dl/g to 0.8 dl/g. In a case where the reduced viscosity thereof is in the above-described range, the balance between the string resistance, the impact resistance, and the surface appearance of the molded article tends to be further improved.

<Saponified Fatty Acid Ester (B)>

The saponified fatty acid ester (B) is obtained by saponifying the fatty acid ester using a known method such as alkaline saponification. Examples of the fatty acid ester include an ester compound of formic acid, acetic acid, propionic acid, butyric acid, valeric acid, caproic acid, capric acid, undecylenic acid, lauric acid, myristic acid, palmitic acid, stearic acid, arachidic acid, behenic acid, lignoceric acid, cerotic acid, montanic acid, melissic acid, or laconic acid. Among these, montanic acid ester is preferable.

The content of the saponified fatty acid ester (B) is preferably in a range of 0.1 parts by mass to 10 parts by mass, more preferably in a range of 0.5 parts by mass to 5 parts by mass, and still more preferably in a range of 1 part by mass to 3 parts by mass with respect to 100 parts by mass of the thermoplastic resin component (A). In a case where the content of the saponified fatty acid ester (B) is less than 0.1 parts by mass, the string resistance of the resin composition tends to be degraded. Further, in a case where the content thereof is greater than 10 parts by mass, the surface appearance of the resin composition tends to become poor and the amount of gas generated tends to be increased.

<Optional Components>

The thermoplastic resin composition of the present invention may contain optional components as necessary.

Examples of the optional components include various stabilizers such as an antioxidant and a photostabilizer; and additives such as a lubricant, a plasticizer, a mold release agent, a dye, a pigment, an antistatic agent, a flame retardant, metal powder, and inorganic filler.

<Production Method>

The thermoplastic resin composition is produced by mixing and dispersing the thermoplastic resin component (A), the saponified fatty acid ester (B), and optional component as necessary using a V type blender or a Henschel mixer and melt-kneading the obtained mixture using a melt-kneader such as a screw type extruder, a Banbury mixer, a pressurization kneader, or a mixing roll. Further, the melt-kneaded product may be pelletized using a pelletizer as necessary.

It is preferable that the production method be a method of producing a thermoplastic resin composition, including mixing the thermoplastic resin component (A) with the saponified fatty acid ester (B) such that the content of the saponified fatty acid ester (B) is in a range of 0.1 parts by mass to 10 parts by mass with respect to 100 parts by mass of the thermoplastic resin component (A) and melt-kneading the obtained mixture using a meal kneader, in which the thermoplastic resin component (A) contains any one or a combination of two or more selected from the group consisting of an acrylonitrile-styrene copolymer (AS resin), an acrylonitrile-α-methylstyrene copolymer (αSAN resin), a styrene-maleic anhydride copolymer, an acrylonitrle-styrene-N-substituted maleimide terpolymer, an acrylonitrile-styrene-α-methylstyrene-N-substituted maleimide tetrapolymer, a styrene-maleic anhydride-N-substituted maleimide terpolymer, an acrylonitrile-butadiene-styrene copolymer (ABS resin), an acrylonitrile-styrene-alkyl (meth)acrylate copolymer (ASA resin), an acrylonitrile-ethylene-propylene-diene-styrene copolymer (AES resin), polymethyl methacrylate, and a polycarbonate resin.

In addition, the thermoplastic resin composition of the present invention can be used as a thermoplastic resin composition for hot plate welding.

<Action Effects>

Since the above-described thermoplastic resin composition of the present invention contains 100 parts by mass of the thermoplastic resin component (A) and 0.1 parts by mass to 10 parts by mass of the saponified fatty acid ester (B), a molded article which has excellent string resistance at the time of hot plate welding, a highly excellent surface appearance, generates a small amount of gas from the material, and has sufficient impact resistance as a material for a lamp housing can be obtained.

The molded article of the present invention contains a molded article for hot plate welding, but the present invention is not limited thereto.

The thermoplastic resin composition of the present invention has a highly excellent surface appearance at the time of obtaining a molded article, generates a small amount of gas, and has sufficient impact resistance as a material for a lamp housing, and the stringing phenomenon during hot plate welding is suppressed. Accordingly, molded articles suitable for vehicle components such as lightning appliances, interiors, and exteriors, OA equipment or home electric appliances, medical instruments, and various industrial materials can be obtained from the thermoplastic resin composition of the present invention.

[Molded Article]

The molded article of the present invention is formed by molding the above-described thermoplastic resin composition of the present invention according to a known molding method.

Examples of the molding method include an injection molding method, a press molding method, an extrusion molding method, a vacuum molding method, and a blow molding method.

The molded article of the present invention has a highly excellent surface appearance, generates a small amount of gas, and has sufficient impact resistance as a material for a lamp housing, and the stringing phenomenon during hot plate welding is suppressed.

The applications of the molded articles include vehicle components such as lightning appliances, interiors, and exteriors, OA equipment or home electric appliances, medical instruments, and various industrial materials. Among these, lightning appliances for vehicles are suitable.

The molded article of the present invention can be formed into a resin conjugate by being welded with another molded article through hot plate welding. Examples of the material serving as another molded article to be joined include an acrylic resin and a polycarbonate resin.

In the resin conjugate obtained in the present invention, the stringing phenomenon at the time of hot plate welding of a joining portion is suppressed and the appearance thereof is excellent.

EXAMPLES

Hereinafter, the present invention will be described in more detail based on examples and comparative examples, but the present invention is not limited to the following examples. Further, "%" and "parts" are on a mass basis unless otherwise specified.

Various measuring methods and evaluation methods in the following examples and comparative examples are as follows.

<Evaluation of Impact Resistance>

A test piece (molded article) was prepared from a pellet-like thermoplastic resin composition using an injection molding machine ("IS55FP-1.5A", manufactured by Toshiba Machine Co., Ltd.) in conformity with ISO 3167. The Charpy impact strength of the obtained test piece was measured in an atmosphere of 23° C. in conformity with ISO 179 (Charpy impact resistance).

<Evaluation of String Resistance During Hot Plate Welding>

A plate-like test piece (molded article) having a length of 100 mm, a width of 20 mm, and a thickness of 3 mm was prepared from a pellet-like thermoplastic resin composition under conditions of a cylinder set temperature of 260° C., a mold temperature of 60° C., and an injection rate of 60 g/sec using a 4 oz injection molding machine (manufactured by Japan Steel Works, Ltd.).

The test piece was brought into contact with a hot plate, which had been heated to 240° C., for 12 seconds, the hot plate and the test piece were separated from each other horizontally by 50 mm, and the string level (the length and the number) during this process was visually confirmed. The evaluation was performed based on the following standards.

A . . . The average length of strings was less than 1 mm, and the number of strings was 5 or less.

B . . . The average length of strings was in a range of 1 mm to 4 mm, and the number of strings was 5 or less.

C . . . The average length of strings was in a range of 4 mm to 8 mm, and the number of strings was 5 or less.

D . . . The average length of strings was 10 mm or greater.

(In a case where the number of strings was 6 or greater in each standard, the rating of the evaluation was lowered by one rank.)

<Evaluation of Gas Generated>

A plate-like test piece having a length of 100 mm, a width of 50 mm, and a thickness of 3 mm was prepared from a pellet-like thermoplastic resin composition under conditions of a cylinder set temperature of 260° C. and a mold temperature of 30° C. using an injection molding machine ("IS55FP-1.5A", manufactured by Toshiba Machine Co., Ltd.) by being molded by 50 shots so as to achieve short shots by lowering the filled resin amount to approximately ⅔ of the volume in a mold, and the amount of gas adhering to the mold was visually determined. The evaluation was performed based on the following standards (gas generation property).

A . . . The amount of gas adhering to the mold was almost zero.

B . . . The amount of gas adhering to the mold was small.

C . . . The amount of gas adhering to the mold was large.

<Evaluation of Surface Appearance>

A plate-like molded article having a length of 100 mm, a width of 100 mm, and a thickness of 2 mm was prepared from a pellet-like thermoplastic resin composition under conditions of a cylinder set temperature of 260° C., a mold temperature of 60° C., and an injection rate of 20 g/sec using a 4 oz injection molding machine (manufactured by Japan Steel Works, Ltd.).

Next, an aluminum deposition film having a film thickness of 50 nm was formed on the surface of the obtained molded article under conditions of a vacuum degree of $6.0 \times 10^{-3}$ Pa and a film formation speed of 1 nm/sec using a vacuum deposition machine ("VPC-1100", manufactured by Ulvac KiKo, Inc.).

The diffuse reflectance of the molded article which had been subjected to direct deposition in the above-described manner was measured using a reflectometer ("TR-1100AD", manufactured by Tokyo Denshoku Co., Ltd.), and the photoluminescent property thereof was evaluated. As the diffuse reflectance thereof was decreased, this indicates that the photoluminescent property, in other words, the surface smoothness was excellent.

[Production of Rubber-Like Polymer (c1)]

Production Example 1: Production of Polybutadiene (PBD)

A pressure-resistant container provided with a stirrer was charged with 150 parts of deionized water, 100 parts of 1,3-butadiene, 3.0 parts of a hardened fatty acid potassium soap, 0.3 parts of organic sodium sulfonate, 0.2 parts of tertiary dodecyl mercaptan, 0.3 parts of potassium persulfate having a 10-hour half-life temperature of 71° C., and 0.14 parts of potassium hydroxide, the mixture was stirred in a nitrogen atmosphere, and polymerization was initiated by increasing the temperature to 60° C. At the time at which the polymerization rate reached 65%, 5 parts of deionized water in which 0.1 parts of potassium persulfate was dissolved was added to the pressure-resistant container, the polymerization temperature was increased to 70° C., and the polymerization was completed at a polymerization conversion rate of 90% for a reaction time of 13 hours (polymerization step). Thereafter, 0.1 parts of sodium formaldehyde sulfoxylate was added to the pressure-resistant container, thereby obtaining a polybutadiene latex. In the obtained polybutadiene latex, the average particle diameter was 80 nm, and the solid content was 52.0%. This resulting product was set as a polybutadiene (PBD) latex.

Production Example 2: Production of Polybutadiene (c1-1)

1.25 parts of acetic acid was added to the polybutadiene (PBD) latex obtained in Production Example 1, and the latex was enlarged (enlargement step), thereby obtaining a polybutadiene latex having an average particle diameter of 210 nm. This resulting product was set as a polybutadiene (c1-1) latex.

Production Example 3: Production of Polybutadiene (c1-2)

1.9 parts of acetic acid was added to the polybutadiene (PBD) latex obtained in Production Example 1, and the latex was enlarged (enlargement step), thereby obtaining a polybutadiene latex having an average particle diameter of 310 nm. This resulting product was set as a polybutadiene (c1-2) latex.

[Production of Graft Copolymer (C)]

Production Example 4: Production of Graft Copolymer (C-1)

A reactor provided with a reagent injection container, a cooling pipe, a jacket heater, and a stirrer was charged with 40 parts of the polybutadiene (c1-1) latex obtained in Production Example 2 in terms of the solid content, 170 parts of deionized water, 0.3 parts of disproportionated potassium rosinate, 0.01 parts of ferrous sulfate heptahydrate, 0.2 parts of sodium pyrophosphate, and 0.5 parts of crystalline glucose. The contents were heated to 60° C. while being stirred, a mixture of 16 parts of acrylonitrile, 44 parts of styrene, 0.4 parts of cumene hydroperoxide, and 0.2 parts of t-dodecylmercaptan was added dropwise thereto for 100 minutes, and graft polymerization was performed. After the dropwise addition, the resultant was heated to 75° C. and stirred and maintained for 1 hour, and the graft polymerization reaction was completed. An antioxidant was added to the polymer obtained by such a reaction, thereby obtaining a graft copolymer (C-1) latex.

The obtained graft copolymer (C-1) latex was added to a dilute sulfuric acid aqueous solution having a liquid temperature of 80° C., the temperature thereof was increased to 90° C. for 30 minutes, and the resultant was solidified, dehydrated, washed, and dried, thereby obtaining a powdery graft copolymer (C-1).

Production Example 5: Production of Graft Copolymer (C-2)

A reactor provided with a reagent injection container, a cooling pipe, a jacket heater, and a stirrer was charged with 50 parts of the polybutadiene (c1-2) latex obtained in Production Example 3 in terms of the solid content, 170 parts of deionized water, 0.3 parts of disproportionated potassium rosinate, 0.01 parts of ferrous sulfate heptahydrate, 0.1 parts of sodium pyrophosphate, and 0.2 parts of crystalline glucose. The contents were heated to 60° C. while being stirred, a mixture of 12 parts of acrylonitrile, 38 parts of styrene, 0.4 parts of cumene hydroperoxide, and 0.1 parts of t-dodecylmercaptan was added dropwise thereto for 100 minutes, and graft polymerization was performed. After the dropwise addition, the resultant was heated to 75° C. and stirred and maintained for 1 hour, and the graft polymerization reaction was completed. An antioxidant was added to the polymer obtained by such a reaction, thereby obtaining a graft copolymer (C-2) latex.

The obtained graft copolymer (C-2) latex was added to a dilute sulfuric acid aqueous solution having a liquid temperature of 80° C., the temperature thereof was increased to 90° C. for 30 minutes, and the resultant was solidified, dehydrated, washed, and dried, thereby obtaining a powdery graft copolymer (C-2).

[Production of Vinyl-Based Copolymer (D)]

Production Example 6: Production of Vinyl-Based Copolymer (D-1)

27 parts of acrylonitrile and 73 parts of styrene were polymerized by known suspension polymerization to obtain an acrylonitrile-styrene copolymer in which the reduced viscosity measured at 25° C. was 0.88 dl/g from a N,N-dimethylformamide solution. This resulting product was set as a vinyl-based copolymer (D-1).

Production Example 7: Production of Vinyl-Based Copolymer (D-2)

15 parts of acrylonitrile, 55 parts of styrene, and 30 parts of N-phenylmaleimide were polymerized by known continuous solution polymerization to obtain an acrylonitrile-styrene-N-phenylmaleimide terpolymer in which the reduced viscosity measured at 25° C. was 0.60 dl/g from a N,N-dimethylformamide solution. This resulting product was set as a vinyl-based copolymer (D-2).

Production Example 8: Production of Vinyl-Based Copolymer (D-3)

29 parts of acrylonitrile, 24 parts of styrene, 36 parts of α-methylstyrene, and 11 parts of N-phenylmaleimide were polymerized by known suspension polymerization to obtain an acrylonitrile-styrene-α-methylstyrene-N-phenylmaleimide tetrapolymer in which the reduced viscosity measured at 25° C. was 0.47 dl/g from a N,N-dimethylformamide solution. This resulting product was set as a vinyl-based copolymer (D-3).

[Saponified Fatty Acid Ester]

As a saponified fatty acid ester (B-1), saponified montanic acid ester "Licowax OP" (manufactured by Clariant Japan K.K.) was used.

[Fatty Acid Ester]

As a non-saponified fatty acid ester (B-2), montanic acid ester "Luwax-E" (manufactured by BASF SE) was used.

Examples 1 to 8 and Comparative Examples 1 to 3

The thermoplastic resin component (A) and the saponified fatty acid ester (B) in the amounts listed in Tables 1 and 2 respectively, 0.5 parts of ethylene bisstearylamide, and 0.1 parts of silicone oil SH200 (manufactured by Dow Corning Toray Co., Ltd.) were mixed using a Henschel mixer. The obtained mixture was melt-kneaded at 250° C. using a screw type extruder ("TEX-30a type twin screw extruder", manufactured by Japan Steel Works, Ltd.), thereby obtaining a thermoplastic resin composition pelletized by a pelletizer.

Test pieces (molded articles) were prepared using the obtained pellet-like thermoplastic resin compositions, and the impact resistance, the surface appearance, the amount of gas generated, and the string resistance at the time of hot plate welding were evaluated. The results thereof are listed in Tables 1 and 2.

TABLE 1

| | | | | Example | | | | | | | | |
|---|---|---|---|---|---|---|---|---|---|---|---|---|
| | | | | | 1 | 2 | 3 | 4 | 5 | 6 | 7 | 8 |
| Formulation [parts by mass] | Thermoplastic resin component (C) | Graft copolymer | C-1 | | 40 | 40 | 40 | 40 | 40 | — | 40 | — |
| | | | C-2 | | — | — | — | — | — | 25 | — | — |

TABLE 1-continued

| | | | | Example | | | | | | | |
|---|---|---|---|---|---|---|---|---|---|---|---|
| | | | | 1 | 2 | 3 | 4 | 5 | 6 | 7 | 8 |
| | (A) | Vinyl-based copolymer (D) | D-1 | 34 | 34 | 34 | 34 | 10 | 49 | 60 | 100 |
| | | | D-2 | 26 | 26 | 26 | 26 | — | 26 | — | — |
| | | | D-3 | — | — | — | — | 50 | — | — | — |
| | Saponified fatty acid ester (B) | | B-1 | 1 | 3 | 0.4 | 9 | 1 | 1 | 1 | 1 |
| Physical properties | Charpy impact resistance | | [kJ/m$^2$] | 6.3 | 7.1 | 6.3 | 5.0 | 7.2 | 18.6 | 5.8 | 2.9 |
| | String resistance | | — | A | A | B | A | A | A | A | B |
| | Gas generation property | | — | A | B | A | B | A | A | A | A |
| | Diffuse reflectance | | [%] | 2.7 | 2.8 | 2.7 | 4.0 | 2.9 | 4.8 | 2.4 | 2.5 |

TABLE 2

| | | | | Comparative Example | | |
|---|---|---|---|---|---|---|
| | | | | 1 | 2 | 3 |
| Formulation [parts by mass] | Thermoplastic resin component (A) | Graft copolymer (C) | C-1 | 40 | 40 | 40 |
| | | Vinyl-based copolymer (D) | D-1 | 34 | 34 | 34 |
| | | | D-2 | 26 | 26 | 26 |
| | Saponified fatty acid ester (B) | | B-1 | 0.05 | 11 | — |
| | Fatty acid ester | | B-2 | — | — | 1 |
| Physical properties | Charpy impact resistance | | [kJ/m$^2$] | 5.7 | 4.2 | 7.2 |
| | String resistance | | — | D | A | D |
| | Gas generation property | | — | A | C | A |
| | Diffuse reflectance | | [%] | 2.5 | 7.2 | 3.0 |

As listed in Table 1, each molded article with excellent string resistance at the time of hot plate welding, a highly excellent surface appearance, which generates a small amount of gas, and has sufficient impact resistance as a material for a lamp housing was obtained from each thermoplastic resin composition obtained in each example.

Meanwhile, as listed in Table 2, in a case of each comparative example, any of the string resistance at the time of hot plate welding, the surface appearance, gas generated, and the impact resistance was degraded.

Specifically, in a case of Comparative Example 1, since the content of the saponified fatty acid ester (B) was less than 0.1 parts by mass, the string resistance was degraded.

In a case of Comparative Example 2, since the content of the saponified fatty acid ester (B) was greater than 10 parts by mass, the surface appearance was poor, and the amount of gas generated was large.

In a case of Comparative Example 3, since the non-saponified fatty acid ester (B) was used, the string resistance was degraded.

INDUSTRIAL APPLICABILITY

According to the present invention, it is possible to provide a thermoplastic resin composition from which a molded article that has excellent string resistance at the time of hot plate welding, a highly excellent surface appearance, generates a small amount of gas, and has sufficient impact resistance as a material for a lamp housing can be obtained. Particularly, the balance between the string resistance, the surface appearance, and the gas generation property is at an extremely high level which cannot be achieved using known thermoplastic resin compositions of the related art. Therefore, the utility value of the thermoplastic resin composition of the present invention for vehicle components such as lightning appliances, interiors, and exteriors, OA equipment or home electric appliances, medical instruments, and various industrial materials is extremely high.

The invention claimed is:

1. A resin conjugate which is a hot olate welded product comprising molded articles that are hot plate welded together, wherein the molded articles include one comprising a thermoplastic resin composition comprising:
    a thermoplastic resin component (A); and
    a saponified fatty acid ester (B),
    wherein the saponified fatty acid ester (B) is present in an amount of 0.1 parts by mass to 10 parts by mass with respect to 100 parts by mass of the thermoplastic resin component (A),
    the thermoplastic resin component (A) contains any one or a combination of two or more selected from the group consisting of an acrylonitrile-styrene copolymer (AS resin), an acrylonitrile-α-methylstyrene copolymer (αSAN resin), a styrene-maleic anhydride copolymer, an acrylonitrile-styrene-N-substituted maleimide terpolymer, an acrylonitrile-styrene-α-methylstyrene-N-substituted maleimide tetrapolymer, a styrene-maleic anhydride-N-substituted maleimide terpolymer, an acrylonitile-butadiene-styrene copolymer (ABS resin), an acrylonitrile-styrene-alkyl (meth)acrylate copolymer (ASA resin), an acrylonitrile-styrene-propylene-diene-styrene copolymer (AES resin), polymethyl methacrylate, and a polycarbonate resin, and
    the thermoplastic resin component (A) contains a graft copolymer (C) in which a vinyl-based polymer (c2) is grafted with a rubber polymer (c1).

2. The resin conjugate according to claim 1, wherein the saponified fatty acid ester (B) is a saponified montanic acid ester.

3. A method for producing the resin conjugate of claim 1, comprising hot plate welding molded articles together, wherein the molded articles include one comprising said thermoplastic resin composition.

4. The method according to claim 3, wherein the saponified fatty acid ester (B) is a saponified montanic acid ester.

* * * * *